United States Patent
Torres

(10) Patent No.: US 6,279,985 B1
(45) Date of Patent: Aug. 28, 2001

(54) SAFETY ATTACHMENT FOR AUTOMOBILE VISORS

(76) Inventor: Richard J. Torres, 892 Winterlane, Tracy, CA (US) 95376

( * ) Notice: Subject to any disclaimer, the term of this patent is extended or adjusted under 35 U.S.C. 154(b) by 0 days.

(21) Appl. No.: 09/429,619

(22) Filed: Oct. 29, 1999

(51) Int. Cl.⁷ .................................................. B60J 3/00
(52) U.S. Cl. .......................................... 296/97.8; 296/97.2
(58) Field of Search ............................... 296/97.1, 97.2, 296/97.3, 97.6, 97.8

(56) References Cited

U.S. PATENT DOCUMENTS

| | | | |
|---|---|---|---|
| D. 58,696 | * | 8/1921 | Banks . |
| 1,982,511 | * | 11/1934 | Geist . |
| 3,751,106 | * | 8/1973 | Mahler et al. . |
| 4,023,855 | * | 5/1977 | Janata et al. . |
| 4,726,620 | * | 2/1988 | Takahashi . |
| 4,890,875 | * | 1/1990 | Takahashi . |
| 5,466,029 | * | 11/1995 | Zetterlund . |
| 5,651,577 | * | 7/1997 | Lacy et al. . |
| 5,695,237 | * | 12/1997 | Erikson et al. . |
| 5,730,484 | * | 3/1998 | Robinson . |
| 6,059,347 | * | 5/2000 | Davalos . |

* cited by examiner

Primary Examiner—D. Glenn Dayoan
Assistant Examiner—Scott Carpenter
(74) Attorney, Agent, or Firm—Alfred F. Hoyte, Jr.

(57) ABSTRACT

A visor extension for an automobile has a clamp with an elongate slot which allows for frictional engagement with the top edge of the existing visor. The clamp is spring loaded to provide sufficient pressure on the visor extension to firmly secure it in position while allowing for adjusting the horizontal position of the extension relative to the existing visor. The extension has an opaque overlapping portion and a tinted extending portion. The opaque portion extends over the existing visor and the tinted portion extends outwardly and downwardly from the opaque portion. The tinted extending portion is shaped to provide coverage especially for the side window to shield the driver from excessive radiation coming through the side window of the vehicle.

4 Claims, 3 Drawing Sheets

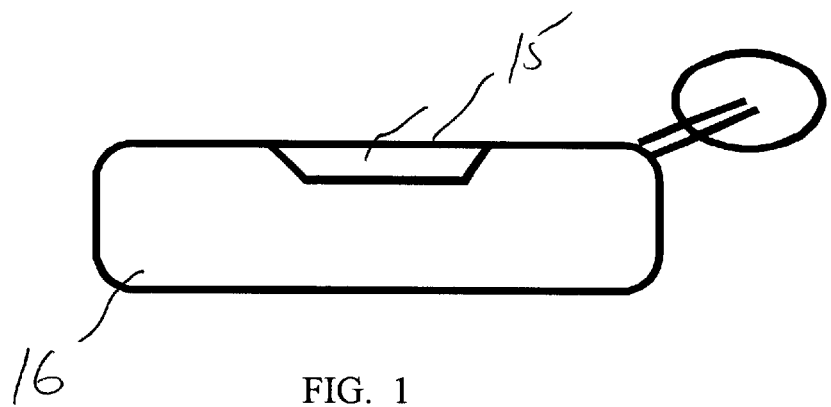
FIG. 1
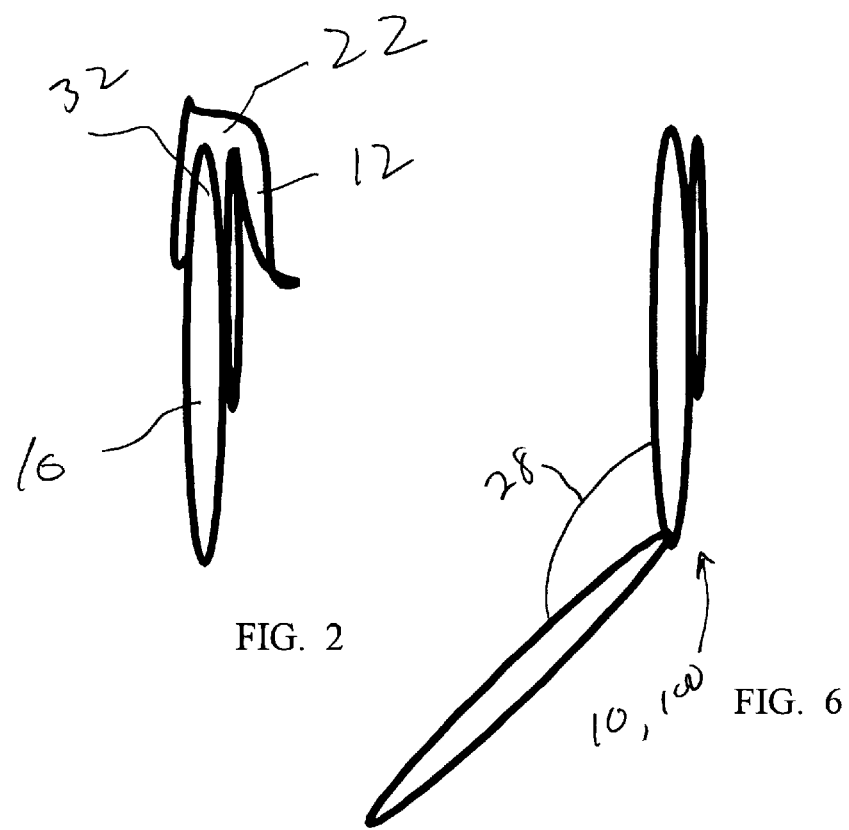
FIG. 2
FIG. 6

SAFETY ATTACHMENT FOR AUTOMOBILE VISORS

BACKGROUND OF THE INVENTION

The present invention relates to safety devices for automobiles. More particularly, it relates to an improved visor attachment.

STATEMENT OF THE PRIOR ART

Various types of visor attachments have been devised for shielding drivers from excessive sunlight. Most of these devices suffer from drawbacks which limit their effectiveness.

U.S. Pat. No. 4,848,822 issued to Da Costa discloses a visor extension which has a sophisticated clamping arrangement for attachment to the existing visor. By contrast, the present invention has a relatively simple clamping arrangement and two piece construction.

U.S. Pat. No. 5,470,122 issued to Feng discloses another visor extension apparatus. Feng is another fairly complex apparatus which includes a plurality of interchangeable screens which are attachable to the visor extension apparatus. By contrast, the present invention contemplates a visor extension apparatus which is of two piece construction and has a shape optimized for effective shading when used for both the front and side windows of the automobiles.

U.S. Pat. No. 5,016,938 issued to Tschan also discloses a complex arrangement including hingedly attached extensions. The present invention contemplates a visor extension assembly having a single sliding extension which is maintained in position by a combination clamp and slide.

None of the above inventions and patents, taken either singly or in combination, is seen to describe the instant invention as claimed.

SUMMARY OF THE INVENTION

The present invention overcomes the disadvantages of the prior art by providing a visor extension for an automobile having two piece construction. In a preferred embodiment, the visor extension has a clamp with an elongate slot which allows for frictional engagement with the top edge of the existing visor. The clamp is spring loaded to provide sufficient pressure on the visor extension to firmly secure it in position while allowing for adjusting the position of the extension. The extension has an opaque overlapping portion and a tinted extending portion. The opaque portion extends over the existing visor and the tinted portion extends outwardly and downwardly from the opaque portion. The tinted extending portion is shaped to provide coverage especially for the side window to shield the driver from excessive radiation coming through the side window of the vehicle.

Accordingly, it is a principal object of the invention to provide a new and improved safety attachment for automobile visors.

Accordingly, it is an object of the invention to provide a new and improved safety attachment for automobile visors designed to provide protection from glare for both the front and side windows.

It is another object of the invention to provide a new and improved safety attachment for automobile visors which has both an opaque portion and a tinted portion.

It is another object of the invention to provide a new and improved safety attachment for automobile visors having a spring loaded clamping assembly which allows for easy removal and attachment as well as horizontal positioning.

It is another object of the invention to provide new and improved safety attachment for automobile visors having an outward and downward extending portion for providing protection from glare and radiation entering the side window of the vehicle.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 shows a perspective view of a first embodiment of a safety attachment for automobile visors.

FIG. 2. shows a side view of the embodiment shown in FIG. 1.

FIG. 6. shows a side view of a modification of the safety attachments which may be incorporated into the first, and second embodiments.

DETAILED DESCRIPTION

Figure 3:
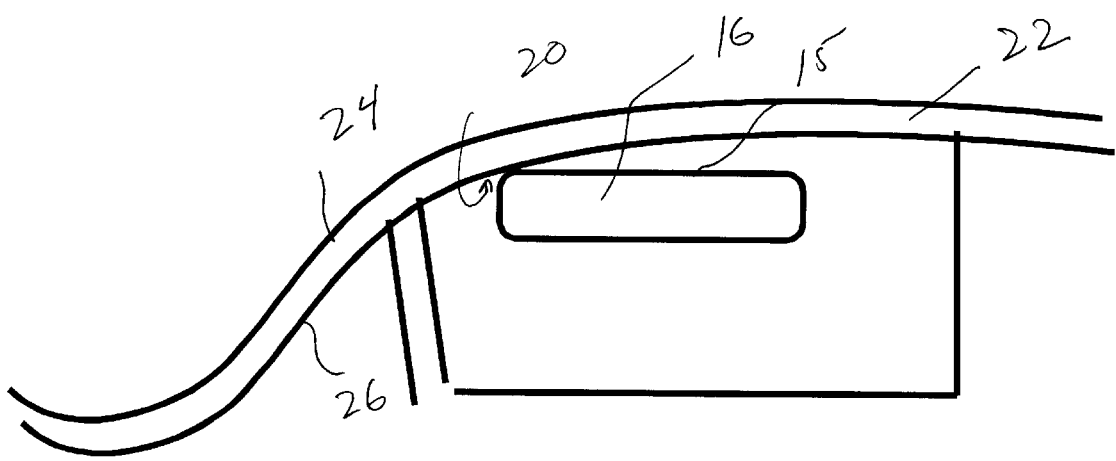
FIG. 3. shows a side view of an automobile with a standard visor.

Referring now to FIGS. 1–4, a visor safety attachment formed in accordance with a first embodiment of the present invention, generally indicated by the numeral 10, is shown. The attachment 10 includes a clamping means 12 and an extension panel 14 and is adapted for releasable attachment to an existing, standard sized, visor 16. The visor 16 is attached to a rod 18 which is pivotally attached to and extended from the interior surface of the roof 20 of the automobile 22. The rod 18 allows for an approximately 90 degree swing of the visor 16 from a position allowing coverage of the windshield 24 of the automobile to a position covering the driver's (or passenger's, not shown) side window 26. As can be seen in FIG. 3, when in position to block glare from the driver's side window 26, the standard visor 16 only covers a small portion of the window 26 and is wholly inadequate to prevent glare and UV radiation from reaching the face and arms of the driver 28 (or passenger). The present invention overcomes this shortcoming by providing a lightweight, inexpensive, visor attachment which fully protects the driver or passenger from glare and UV rays coming through the side window. One embodiment of the invention may also be used to protect the driver from glare and radiation coming through the windshield 24 during periods when there are extremely low sun angles such as sunrise and sunset as will be explained in more detail later.

The clamping means 12 has a centrally disposed elongate channel 32 sized to allow for frictional engagement with the top edge 15 of the visor 16. The clamping means 12 is preferably formed from plastic or other rigid, lightweight material. The extension panel 14 is preferably secured to the clamping means by means of a pair of screws 34 or other releasable fastening means. The screws 34 are preferably screwed from the interior of the channel 32 into and through apertures 38 formed in the extension and secured by a nut 40 which is mounted flush against the exterior surface of the clamping means 12. Apertures 38 are preferably made sufficient deep to prevent snagging of the screw heads as the attachment 10 is horizontally slid into the desired position as will be described in more detail later.

The extension panel 14 is constructed of two different materials. A first material is used for the overlapping portion 44 of the extension 14. Cardboard covered with cloth or other inexpensive material, such as plastic, may be used for this purpose. The shading or extending portion 46 is preferably made from a dark cloth material or plastic tinted material. If a cloth material is used it is preferably translucent in moderate sunlight so as to afford the driver some visibility therethrough. The edge 50 of the cardboard used for the overlapping portion 44 may be reinforced by a metal wire 52 which also serves to define the outer edge of the extending portion 46. Reinforcement of the edge 50 of the cardboard may be accomplished by providing a channel or slot in the cardboard and inserting the wire 52 therethrough, or otherwise securing the cardboard around the wire as would be apparent to one skilled in the art. It can be appreciated that the wire will keep the cloth material of the extending portion 46 in position. The extending portion 46 extends outwardly and downwardly from the overlapping portion 44 and thus extends outwardly and downwardly from the visor 16. The transition from the overlapping portion 44 to the extending portion 46 is indicated by broken line 49. Coverage of the unprotected area shown in FIG. 3 is provided by the extending portion 46. Sliding the extending portion 46 allows the driver 28 or passenger to adjustably position the attachment 10 as desired. If a plastic tinted material is used for the extending portion 46 it may be secured to the overlapping portion 44 by an adhesive. In the preferred embodiment, the distance from the bottom edge of the extending portion 46 to the top edge of the attachment 10 is about 9 inches, and the width of the top edge of the attachment is 18 inches. The width of the bottom edge of the extending portion is about 9 inches.

Figure 5:
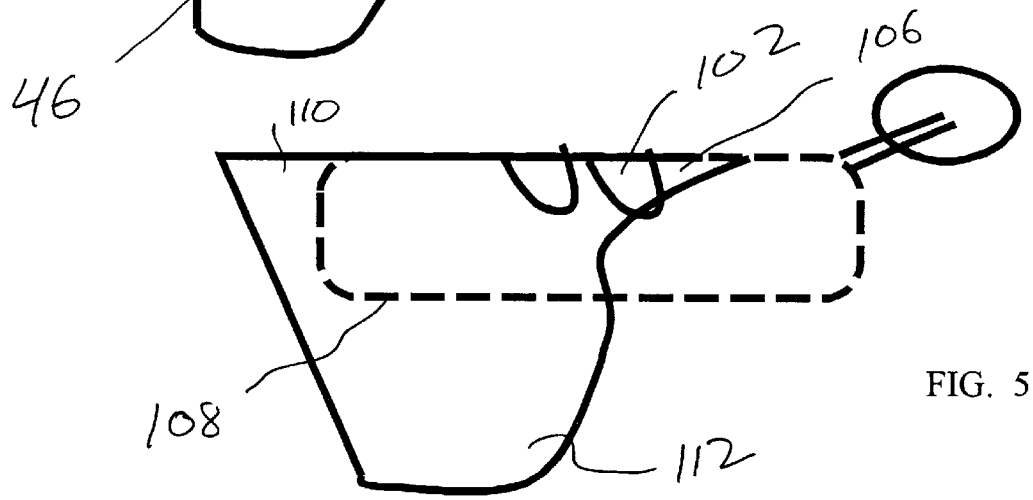
FIG. 5. shows a plan view of a second embodiment of a safety attachment for automobile visors.

Referring now to FIG. 5, an alternative embodiment of the attachment 100 is shown. This embodiment may be used for automobiles with large passenger/driver side windows. A pair of clamps 102 are mounted at one end of the upper edge 104 of the overlapping portion 106 of the device. This arrangement allows the attachment 100 to be slid farther along the edge 104 to provide coverage for the larger window 26. The materials may be the same as the first embodiment. The attachment may be folded along broken line 108 by providing score lines or a weakened or relatively thin area (not shown) on wire reinforcement 52. If plastic is used for the extending portion 112, then score lines or other mechanism as may be apparent to a skilled artisan may be used to facilitate folding of the extending portion 112. It should be noted that the invention contemplates a very inexpensive attachment 10, 100 which may be sold, e.g., via vending machines, and is not designed for extended use over a long period of time. The dimensions of the extending portion 112 may be slightly larger than those described in connection with the first embodiment.

Referring now to FIG. 6 a side or edge view of the attachment 10, 100 is shown. This view illustrates the attachment 10, 100 in a partially folded position, as may be attained by providing score lines in the appropriate positions as has been previously described. In this position the attachment 10, 100 can effectively block reflected glare from ground level objects or glare from headlights. It can be readily appreciated that moving the extended portion 46, 112 closer to the driver 28 at an angle as shown can allow for more effective coverage of the lower portion of the side window 26.

Figure 7:
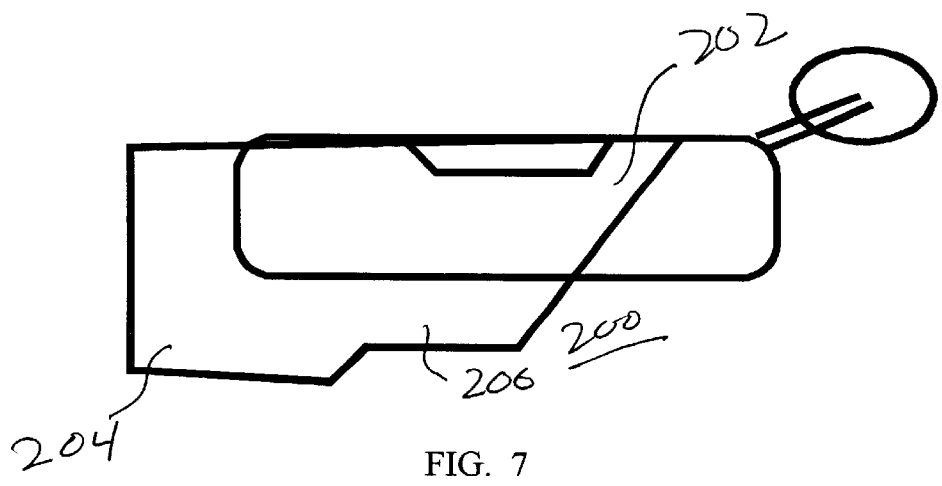
FIG. 7. a plan view, partly in section, of a third embodiment of the present invention.
Figure 4:
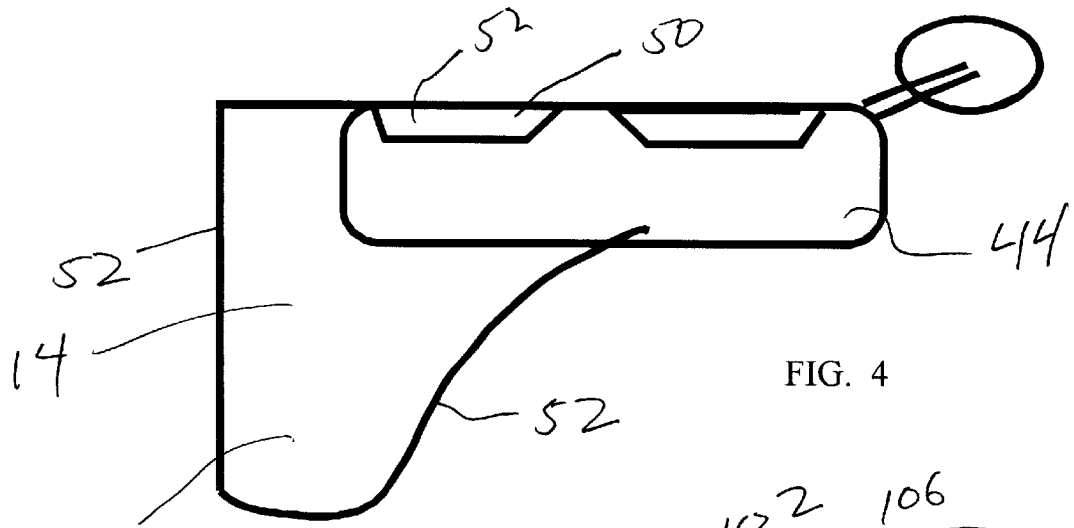
FIG. 4. shows plan view of the safety attachment shown in FIG. 1.

Fig. 7. shows a third embodiment of the attachment 200. The attachment 200 has the same basic components but, in addition to the overlapping portion 202 and extending portion 204, an additional shading area 206 is added to provide additional shading. Thus the attachment may be used effectively for both the windshield 24 and side window 26.

In operation, the attachment 10, 100, 200 is slid over the visor 16 with the clamping means 12 engaged with the top edge 15, 104 of the visor 16. The clamping means 12, which is sized for snug engagement with the visor top edge 15, 104, has a smooth interior surface to allow sliding of the attachment 10, 100, 200 across the top edge 15, 104. The driver 28 may then flip the visor 16 up and out of the way. When needed to prevent excessive glare at the side window 26, which may also be a passenger front side window, the driver 28 or passenger may pivot the visor 16 to the side window 26 and horizontally adjust the attachment 10, 100, 200 as needed.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. A sun visor attachment adapted to be secured to a preexisting sun visor of a vehicle having a windshield, driver, and passenger side windows, said sun visor attachment comprising:

a main body portion having attachment means for removably securing said main body portion to said preexisting sun visor, said main body portion including an overlapping portion formed from a first material and having dimensions approximately equal to said visor, said attachment means allowing for horizontal positioning of said visor attachment along a top edge of said sun visor; an extending portion extending outwardly and downwardly from said overlapping portion and formed from a second material, said extending portion being sized to block radiation entering an area of said driver's side window not covered by said preexisting visor, wherein said extending portion is attached to said overlapping portion by a score line formed in said overlapping portion to allow for folding of said extending portion to selectively block a predetermined portion of said area of said driver's side window.

2. The attachment of claim 1 wherein said first material is opaque and said second material is tinted.

3. The attachment of claim 1 wherein said first material is cardboard and said second material is a translucent cloth.

4. The attachment of claim 1 wherein a wire is embedded along an edge of said overlapping portion, said wire extending to and defining an outer edge of said extending portion.

\* \* \* \* \*